United States Patent [19]

Shiomi et al.

[11] 4,210,343
[45] Jul. 1, 1980

[54] AUTOMOTIVE SUSPENSION SYSTEM

[75] Inventors: Masanao Shiomi, Toyota; Masakazu Ishikawa, Aichi; Hiroshi Kato, Toyota, all of Japan

[73] Assignee: Toyota Jidosha Kogyo Kabushiki Kaisha, Toyotashi, Japan

[21] Appl. No.: 3,094

[22] Filed: Jan. 12, 1979

Related U.S. Application Data

[63] Continuation of Ser. No. 777,894, Mar. 16, 1977, abandoned.

[30] Foreign Application Priority Data

Apr. 5, 1976 [JP] Japan .................................. 51/40890

[51] Int. Cl.$^2$ ............................................. B60G 11/52
[52] U.S. Cl. ..................................... 280/668; 267/33; 280/692
[58] Field of Search .............. 280/668, 671, 662, 692, 280/696, 697, 701, 96.1, 660, 666, 667; 267/21 R, 21 A, 20 A, 33, 63 R

[56] References Cited

U.S. PATENT DOCUMENTS

| | | | |
|---|---|---|---|
| 2,916,282 | 12/1959 | Muller | 280/696 |
| 3,957,128 | 5/1976 | Le Salver | 280/692 |
| 4,084,837 | 4/1978 | Milner | 267/63 R |

*Primary Examiner*—John J. Love
*Assistant Examiner*—John A. Carroll
*Attorney, Agent, or Firm*—Kane, Dalsimer, Kane, Sullivan and Kurucz

[57] ABSTRACT

A MacPherson strut type automotive suspension system having an attaching portion to a body of an automobile. This attaching portion includes an inner cylindrical member secured to a piston rod in a shock absorber, an outer cylindrical member disposed in coaxial relation to the inner cylindrical member and secured to the body of an automobile, and a cylindrical resilient member interposed between the both inner and outer cylindrical members.

A stopper is secured to the inner cylindrical member and adapted to abut the bottom surface of the cylindrical resilient member, thereby preventing an excessive displacement of the resilient member in its axial direction.

3 Claims, 4 Drawing Figures

4,210,343

AUTOMOTIVE SUSPENSION SYSTEM

This is a continuation of application Ser. No. 777,894, filed Mar. 16, 1977, and now abandoned.

BACKGROUND OF THE INVENTION

This invention relates to an automotive suspension system, and more particularly to a MacPherson strut type suspension system.

The MacPherson strut type suspension system includes a shock absorber having a piston-cylinder assembly and a coil spring. A cylinder in the shock absorber is coupled to an axle of an automobile, while a piston rod in the shock absorber is provided with an attaching portion to a body of an automobile. A coil spring is secured at its opposite ends to the piston rod and the cylinder, respectively, thereby absorbing a shock to be imposed on an automobile, when the automobile hits a bump or a hole in the road. In addition, the shock absorber absorbs vibration energy of a coil spring.

A resilient member is built in an attaching portion of the piston rod for preventing the transmission of a high frequency, small amplitude, light vibratory load (This will be referred to as a high frequency light vibratory load, hereinafter.) to an automotive body. For effectively preventing the transmission of such high frequency, light vibratory load, it is preferable to use a resilient member having a small elastic coefficient, i.e., a soft resilient member. However, with the aforesaid MacPherson strut type, the opposite ends of a coil spring are coupled to a piston rod and a cylinder, so that a low frequency, large amplitude, heavy load is applied to the resilient member built in the attaching portion. An increased displacement of the resilient member due to such a heavy vibratory load lowers operationability of an automobile, and accelerates deterioration of a resilient member. In addition, such a large displacement of a resilient member is not desirable from viewpoint of the space considerations in design, because a large space is required for preventing interference of the attaching portion with an automotive body.

Accordingly, this problem boils down to the fact that, for effectively preventing the transmission of a high frequency, light vibratory load or vibrations to an automotive body, as well as a large displacement of a resilient member due to a low frequency heavy vibratory load, it is preferable to provide a non-linear characteristic to a stress-strain relationship of the resilient member, i.e., a characteristic, in which the resilient member is susceptible to a light load but reluctantly causes an elastic deformation for a heavy load.

For this reason, there have been proposed various kinds of resilient-member-supporting constructions for an attaching portion of a prior art MacPherson strut type. However, these are too complicated in construction or result in the failure to isolate vibrations from an automotive body or to achieve desired operationability.

SUMMARY OF THE INVENTION

It is accordingly an object of the present invention to provide an automotive suspension system which avoids the aforesaid shortcomings, is simple in construction, successfully isolates vibrations from an automotive body and provides desired operationability.

According to the present invention, there is provided an automotive suspension system of a MacPherson strut type, which includes a resilient member disposed between a piston rod in a shock absorber and an automotive body, and a stopper to restrain an excessive displacement of the resilient member due to a low frequency, heavy vibratory load. In this respect, the resilient member should provide a small elastic coefficient or softness for effectively preventing the transmission of a high frequency, light vibratory load, and hence provide a non-linear characteristic to its stress-strain relationship.

More specifically, the present invention provides an automatic suspension system including: an inner cylindrical member secured to a piston rod in a shock absorber; an outer cylindrical member secured to an automotive body in coaxial relation to the inner cylindrical member; a cylindrical resilient member secured to the inner and outer cylindrical members and disposed therebetween; and a stopper secured to the inner cylindrical member in the close vicinity of one end surface of the resilient member. The stopper is adapted to restrain an excessive displacement of the resilient member in its axial direction for retaining desired operationability of an automobile.

DESCRIPTION OF THE PREFERRED EMBODIMENTS

The present invention will be described in more detail with reference to the accompanying drawings which indicate embodiments of the invention.

Figure 1:
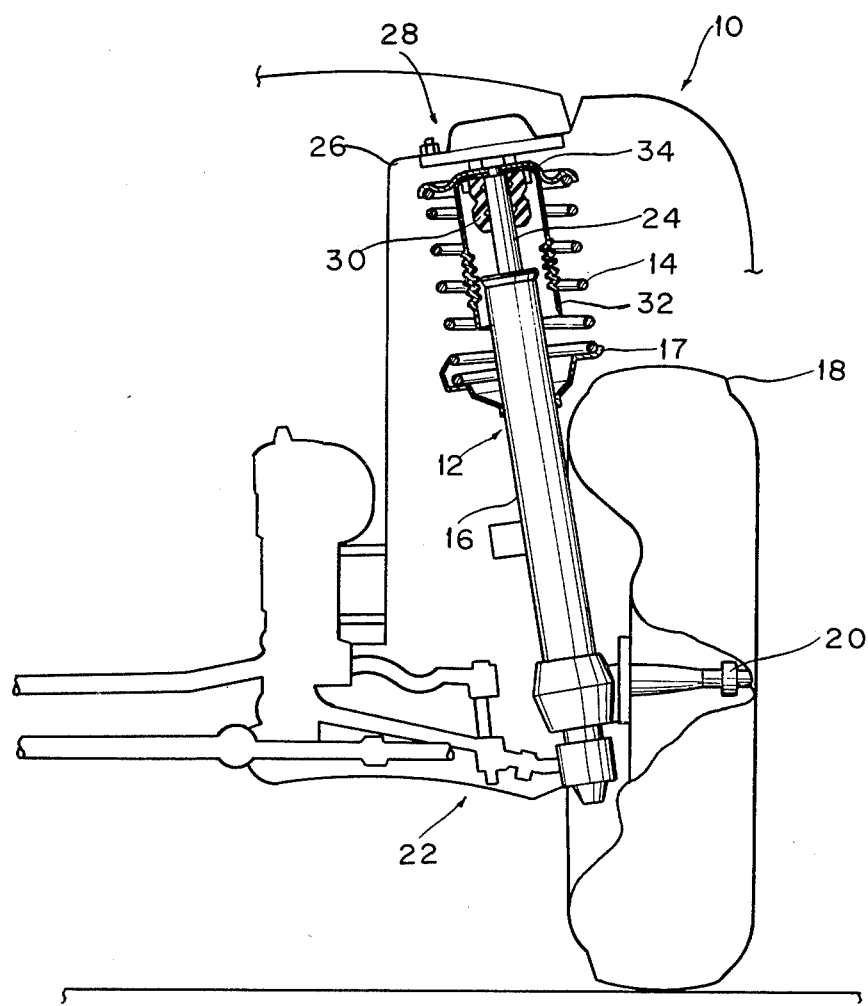
FIG. 1 is a view showing an outline of a suspension system according to the present invention.

Referring now to FIG. 1, there is shown at 10 a suspension system according to the present invention. The suspension system 10 includes a shock absorber 12 consisting of a piston and a cylinder, and a coil spring 14 disposed around the shock absorber. Secured to a cylinder 16 in the shock absorber 12 are a spring seat 17 and a steering knuckle 20 serving as an axle of a wheel 18. The end portion of the cylinder 16, to which is secured the steering knuckle 20, is supported by a body of an automobile through the medium of an arm mechanism 22 similar to that used in a well known MacPherson strut type suspension system.

Figure 2:
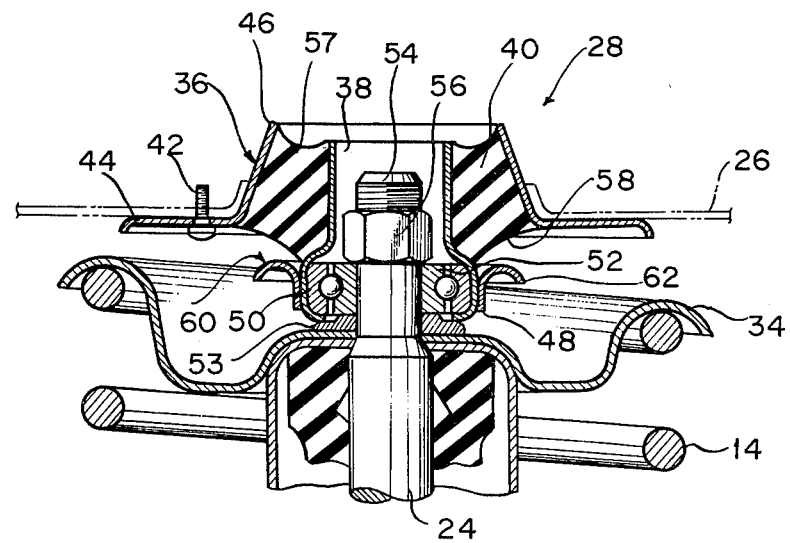
FIG. 2 is a cross-sectional view of an attaching portion of the suspension system of FIG. 1 to a body of an automobile.

Provided at the end of a piston rod 24 in the shock absorber 12 is an attaching portion 28 for the absorber 12 to an body 26 of an automobile. Provided in the vicinity of the attaching portion 28 for the piston rod 24 are a bound stopper 30, a dust cover 32 and a spring seat 34 of a conventional type. A coil spring 14 is confined between the both spring seats 17 and 34 in a manner to extend along the length of the shock absorber 12. As shown in FIG. 2, the attaching portion 28 provided on the piston rod 24 is of a cylindrical form, and includes an outer cylindrical member 36 secured to the body 26, and an inner cylindrical member 38 secured to the piston rod 24 in coaxial relation to the outer cylindrical member 36, and a cylindrical resilient member 40 disposed between the both cylindrical members 36, 38.

The outer cylindrical member 36 consists of an annular flange portion 44 to be secured to the body 26 by a suitable fastening means 42, and a frusto-conical portion 46 extending from the inner peripheral edge of the flange portion 44 upwards. The frusto-conical portion 46 is converged upwards, such that its walls in its cross section are inclined inwardly respectively. The inner cylindrical member 38 is positioned internally of the outer cylindrical member 36 in coaxial relation thereto, with its lower end secured to an outer race 50 in a ring-shaped bearing 48. An inner race 52 in the bearing 48, along with the spring seat 34, is fixedly held between an end portion of the piston rod 24 and a nut 56 tightened on a male-thread portion 54 provided on an end portion of the piston rod 24. A seal member 53 is interposed between the spring seat 34 and the inner race 52.

The resilient member 40 has a relatively small elastic coefficient. An outer peripheral surface of the resilient member 40 is bonded or secured to the inner peripheral surface of a frusto-conical portion 46 of the outer cylindrical member 36, and hence of a frusto-conical shape, as well. In addition, an inner peripheral surface of the resilient member 40 is secured to an outer peripheral surface of the inner cylindrical member 38. An annular groove or annular concave contour is provided in a top surface 57 of the cylindrical resilient member 40 and runs in the circumferential direction of the member 40. Another annular concave contour is also provided in a bottom surface 58 of the resilient member 40, and is converged downwardly.

Figure 3:
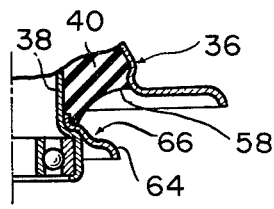
FIG. 3 is a longitudinal cross-sectional view of another embodiment of the attaching portion of the system according to the present invention.

A stopper 60 is secured to the inner cylindrical member 38 under the bottom surface 58 of the member 40. The stopper 60 includes a flange portion 62 of an arcuate cross section, which extends outwardly in opposed relation to the bottom surface 58 of the resilient member 40. The outer diameter of the flange portion 62 is substantially equal to the maximum diameter of the bottom surface 58 of the resilient member 40. In addition, the outer edge of the flange portion 62 is rounded downwards, so that the outer edge of the flange portion will not give a damage to the resilient member 40, when the flange portion 62 abuts the bottom surface 58 of the resilient member 40. The flange portion 62 is spaced a given distance from the bottom surface 58 of the resilient member 40 in a static load condition, when the attaching portion 28 is assembled into the body of an automobile. With the embodiment of FIG. 2, the flange portion 62 of the stopper 60 extends almost over the bottom surface 58 of the member 40. Alternatively, as shown in FIG. 3, a flange portion 64 of a stopper 66 may extend downwards towards the lower end of the inner cylindrical member 38, providing a substaintially 'S' shaped cross section.

Figure 4:
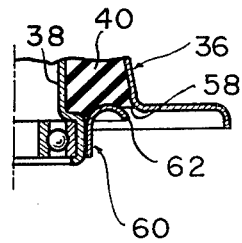
FIG. 4 is a longitudinal cross-sectional view of the attaching portion of FIG. 2 in a dynamic load condition.

As in the case of a conventional type suspension system, the suspension system 10 according to the present invention resiliently supports an axle 20 of a wheel 18 on the body 26 according to the elastic action of the coil spring 14, so that the vibration energy from the coil spring 14 may be absorbed by the shock absorber 12 in a manner that vibrations of the coil spring 14 may be dampened or die out. Meanwhile, a high frequency, light vibratory load to be transmitted through the medium of the axle 20 to the piston rod 24 when an automobile runs on a rough road, act on the resilient member 40 interposed between the inner cylindrical member 38 and the outer cylindrical member 36 in the form of a vibratory load acting along the axis of the piston rod 24. A high frequency, light vibratory load causing a noise problem is loaded in shear on the soft resilient member 40. Shear elastic deformation of the resilient member 40 absorbs the high frequency light vibratory load or vibrations and thus isolates the vibrations from an automobile body. In addition, as a vibratory load of a low frequency is increased, there is an increase in displacement of the resilient member 40 along the axis of the piston rod 24. However, as shown in FIG. 4, the flange portion 62 of the stopper 60 abuts the bottom surface 58 of the resilient member 40, with a contacting area being increased in proportion to an increase in displacement of the member 40. As a result, the resilient member 40 is restricted for its displacement along the axis thereof, while the resilient member 40 is pressed on its bottom surface by the stopper 60 towards the frusto-conical cylindrical portion 46 of the outer cylindrical member 36. Accordingly, an elastic coefficient of the resilient member 40 is increased, so that the resilient member 40 will not be displaced to a large extent due to a heavy vibratory load. Meanwhile, the resilient member 40 is pressed against the frusto-conical portion 46 of the outer cylindrical member 36 under the action of the stopper 60 and an increased vibratory load, so that the low frequency heavy vibratory load which has been acting in shear acts on the outer peripheral portion of the resilient member 40 in the form of a compression force. The freedom of a large shear acting on the resilient member 40 leads to improved durability or service life of the member 40.

As is apparent from the foregoing description of the suspension system according to the present invention, an excessive displacement of the resilient member may be restricted by a stopper, thereby imparting a desired non-linear characteristic to the stress-strain relationship of a resilient member, with the result that high frequency light vibratory load or vibrations tending to cause a noise problem are effectively isolated from a body of an automobile. In addition, an excessive displacement of the attaching portion to a body of an automobile may be prevented, improving the operationability of an automobile. In addition, the suspension system according to the present invention is simple in construction, allowing simple attachment to the body of an automobile.

What is claimed is:

1. A suspension system including a shock absorber having a piston-cylinder assembly, comprising:
   an inner cylindrical member secured to a piston rod in said shock absorber;
   an outer cylindrical member disposed coaxially of said inner cylindrical member and secured to a body of an automobile;
   a resilient member of a cylindrical form, which is positioned between said inner cylindrical member and said outer cylindrical member, said resilient member having an inner peripheral surface and an outer peripheral surface secured to said inner and outer cylindrical members, respectively, an inwardly concave contour being provided in the bottom surface of said resilient member, the lower portion of said resilient member being converged downwards, whereby high frequency, light vibratory loads capable of causing noise problems are loaded in shear on the resilient member and are effectively absorbed to thus isolate vibration from the body of the automobile; and
   a stopper disposed in the close vicinity of the end surface of said resilient member and secured to said inner cylindrical member, said stopper including a flange portion spaced from and adapted to abut the bottom surface of said cylindrical resilient member, the outer edge of said flange portion being rounded downwards, the flange portion of said stopper having a substantially "S" shaped cross-section which extends downwards in opposed relation to said bottom surface of said cylindrical resilient member, whereby said flange may abut said bottom surface of said resilient member to restrict an excessive displacement of said resilient member in its axial direction such that the contacting area between said cylindrical resilient member and said flange increases in proportion to the displacement of said cylindrical resilient member, thereby imparting a nonlinear characteristic to the stress-strain relationship of the resilient member.

2. A suspension system as set forth in claim 1, wherein said outer cylindrical member comprises an annular flange portion secured to a body of an automobile, and a cylindrical portion extending from the inner peripheral edge of said annular flange upwards, said cylindrical portion being of a frusto-conical form, and said cylindrical resilient member having an outer peripheral surface of such a frusto-conical form which matches with the shape of said cylindrical portion.

3. A suspension system as set forth in claim 1, wherein an annular groove or annular concave contour is provided in a top surface of said cylindrical resilient member.

* * * * *